(12) United States Patent
Steele et al.

(10) Patent No.: US 8,136,136 B2
(45) Date of Patent: Mar. 13, 2012

(54) RECORDING MULTI-STREAM INTERACTIVE TELEVISION

(75) Inventors: Toby Steele, Dublin (IE); Renaud Bordelet, Dublin (IE); Glenn Curtis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 11/704,521

(22) Filed: Feb. 9, 2007

(65) Prior Publication Data

US 2008/0196078 A1 Aug. 14, 2008

(51) Int. Cl.
*G06F 3/00* (2006.01)
*G06F 13/00* (2006.01)
*H04N 5/445* (2006.01)

(52) U.S. Cl. ............... 725/55; 725/39; 725/40; 725/41; 725/58; 725/61; 386/243; 386/297

(58) Field of Classification Search ............ 725/37–61, 725/68, 100, 131, 139, 151; 386/243, 297
See application file for complete search history.

(56) References Cited

U.S. PATENT DOCUMENTS

| | | | |
|---|---|---|---|
| 7,017,174 | B1 | 3/2006 | Sheedy |
| 2002/0129383 | A1 | 9/2002 | Wasilewski |
| 2002/0144288 | A1 | 10/2002 | Kitsukawa |
| 2002/0174430 | A1* | 11/2002 | Ellis et al. ............... 725/46 |
| 2003/0110511 | A1* | 6/2003 | Schutte et al. ............. 725/131 |
| 2003/0149988 | A1 | 8/2003 | Ellis et al. |
| 2004/0154040 | A1 | 8/2004 | Ellis |
| 2004/0223738 | A1* | 11/2004 | Johnson .................... 386/83 |
| 2004/0255336 | A1* | 12/2004 | Logan et al. ............. 725/135 |
| 2005/0251827 | A1 | 11/2005 | Ellis et al. |
| 2005/0273819 | A1 | 12/2005 | Knudson et al. |
| 2005/0275758 | A1 | 12/2005 | McEvilly et al. |
| 2006/0078296 | A1* | 4/2006 | Takao ...................... 386/68 |
| 2006/0140584 | A1 | 6/2006 | Ellis et al. |
| 2006/0161955 | A1 | 7/2006 | Newton et al. |

FOREIGN PATENT DOCUMENTS

WO  WO 2005104557 A1  11/2005

OTHER PUBLICATIONS

Meuleman et al., "Double Agent—Presentation and Filtering Agents for a Digital Television Recording System", Date: Apr. 1998, http://delivery.acm.org/10.1145/290000/286500/p3-meuleman.pdf?key1=286500&key2=4053074611&coll=GUIDE&dl=GUIDE&CFID=5593997&CFTOKEN=80537945.

Rauschenbach et al., "A Scalable Interactive TV Service Supporting Synchronized Delivery over Broadcast and Broadband Networks", http://www.ipsi.fraunhofer.de/~pwolf/docs/IBC04-SAVANT-ConfPaper.pdf.

* cited by examiner

*Primary Examiner* — Pankaj Kumar
*Assistant Examiner* — Alazar Tilahun

(57) ABSTRACT

Detailed herein is a technology which, among other things, allows recording and playback of multi-stream interactive television. In one approach to this technology, the service configuration for an interactive television feature is determined. Data describing this service configuration is then obtained, and a recording device is then configured to record a portion of the interactive television feature. A number of data streams associated with that portion of the interactive television feature are recorded. The recorded portion of the interactive television feature can then be displayed.

20 Claims, 11 Drawing Sheets iTV Network 100

Personal Video Recorder 300

Flowchart 510

Flowchart 530

User Interface 699

Flowchart 600

Flowchart 700

RECORDING MULTI-STREAM INTERACTIVE TELEVISION

BACKGROUND

In recent years, the field of television has been the subject of substantial innovation. High-definition content has provided a better picture, while digital delivery has allowed for greater interactivity with viewers. Devices like the digital video recorder (DVR) or personal video recorder (PVR) have allowed users an unprecedented degree of control over their television viewing time.

Interactive television services, in particular, offer the potential for a truly novel television viewing experience. Rather than the simple delivery of a single broadcast over a single channel, interactive television (iTV) offers the potential of presenting multiple related services, which may span multiple channels, under the umbrella of a single unifying interface.

SUMMARY

Described herein is a technology which, among other things, allows the recording and playback of interactive television content. Such interactive television content often includes links between a number of different sub-features, which may be spread across multiple digital channels.

In one approach to this technology, the service configuration for an interactive television feature is determined. Data describing this service configuration is then obtained, and a recording device is then configured to record a portion of the interactive television feature. A number of data streams associated with that portion of the interactive television feature are recorded. The recorded portion of the interactive television feature can then be displayed.

In another approach to this technology, a personal video recorder (PVR) is used to record multi-stream interactive television. The PVR includes an input module, which receives the interactive television service, a recording module, which records a number of data streams associated with a portion of the interactive television service, a storage module, for storing the recorded data streams, and a playback module, which allows playback of the recorded portion of the interactive television service.

Another approach to this technology is described, where a computer-readable medium is described, containing computer-executable instructions to retrieve a stored interactive television service. A necessary signal for allowing playback is emulated, and interaction with an available interactive element included in the interactive television service is allowed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1:
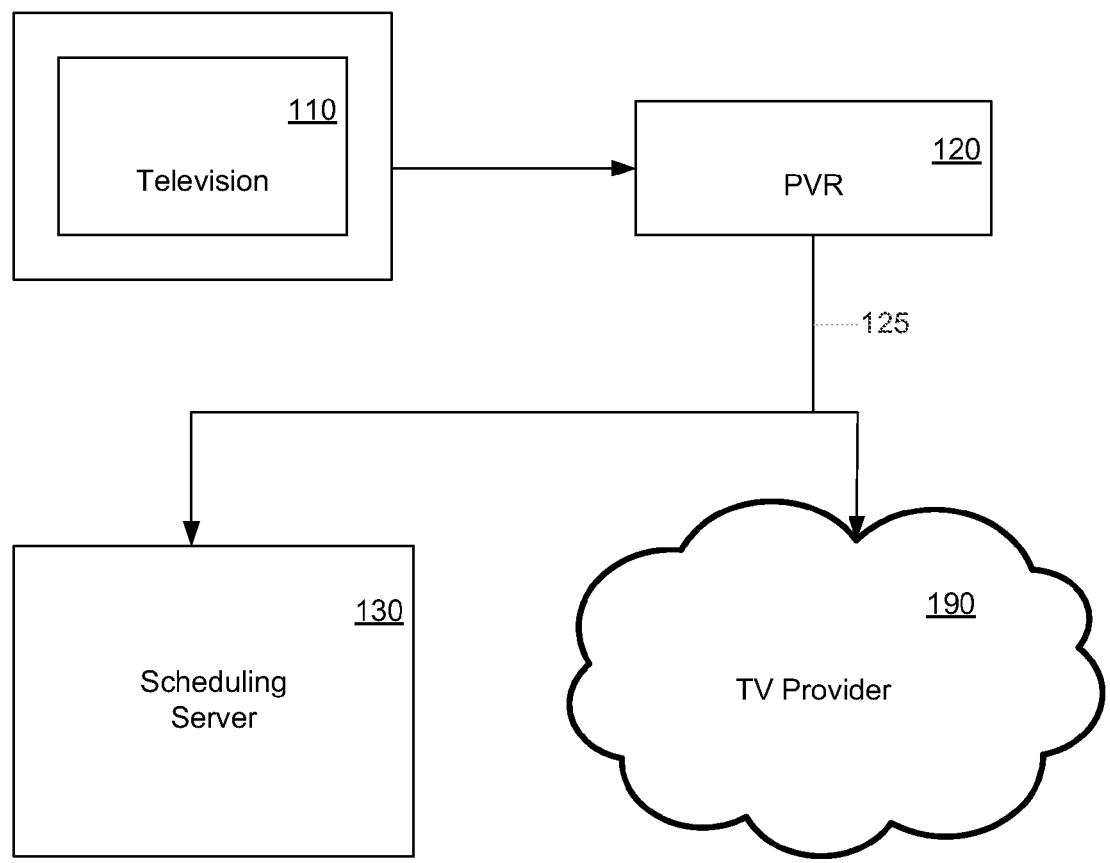
FIG. 1 is a depiction of an interactive television network, in accordance with one embodiment.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as personal video recorder 300, typically include at least some form of computer readable media. Computer readable media can be any available media that can be accessed by a computing device. By way of example, and not limitation, computer readable medium may comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Interactive Television

Interactive television (iTV) can be used to group a number of related features or services into a single unified structure. For example, an iTV broadcast of the Olympic Games can be constructed to offer a "main" channel, where a user would be able to view highlights of various portions of the games, and also obtain a stand-alone program, such as a guide to the Olympic Games, which would download to his set-top unit, e.g., a digital receiver, and with which he could view information about which events are currently occurring. This stand-alone program could also present the user with selectable options, such as a menu of the available events, where selection of one of these events would cause the television to change channels to view the selected event, without the user needing to change channels or even knowing that they are on a different channel.

The flexibility allowed by interactive television extends beyond the scope of the traditional PVR functionality. A traditional PVR will have one or two tuners, which allow it to record broadcasts on a corresponding number of channels at any given time. Because interactive television services may span an indefinite number of channels, with varying degrees of interactivity between these different channels, it is not possible for a traditional PVR to record an interactive TV service spanning more than one channel in a way that would allow the user to make use of the interactive elements at a later time. In short, traditional PVRs do not allow for non-real-time interaction with a multi-channel iTV service.

In the following description, embodiments seek to address this shortcoming. By determining the interrelationships between the various portions of an iTV service, and configuring a PVR to allow it both to record some or all of an iTV service, and to play back the resulting recording or preserving interactive elements, these embodiments provide a number of enhancements over traditional PVRs.

Operating Environment

With reference now to FIG. 1, an interactive television (iTV) network 100 is depicted, in accordance with one embodiment. While iTV network 100 is shown as incorporating specific, enumerated features, it is understood that embodiments are well suited to applications having fewer, additional, or different elements and configurations. In particular, embodiments are well suited to applications involving delivery of television content by radio transmission, coaxial or fiber-optic network, or satellite transmission.

ITV network 100 is shown as including television 110. In some embodiments, television 110 is of a type that allows for display and interaction with digital television broadcasts. In other embodiments, television 110 is coupled to a digital receiver or similar device (not shown), which provides this functionality.

ITV network 100 also includes personal video recorder (PVR) 120, which is coupled to TV 110. In some embodiments, PVR 120 allows for the recording and playback of various types of television services. In some embodiments, PVR 120 may provide additional functionality, e.g., digital cable receiver. In some embodiments, PVR 120 may be integrated into television 110. In other embodiments, PVR 120 may comprise other devices.

As depicted, PVR 120 uses connection 125 to interact with scheduling server 130 and TV provider 190. In the depicted embodiment, scheduling server 130 provides PVR 120 with information regarding television services, e.g., information regarding when a particular show will be aired, and on which channel. TV provider 190, the depicted embodiment, transmits television services to PVR 120 and television 110. In some embodiments, TV provider 190 and scheduling server 130 may be incorporated into a single element, e.g., a cable provider who also provides subscribers with a PVR service.

Physical and Logical ITV Services

Figure 2:
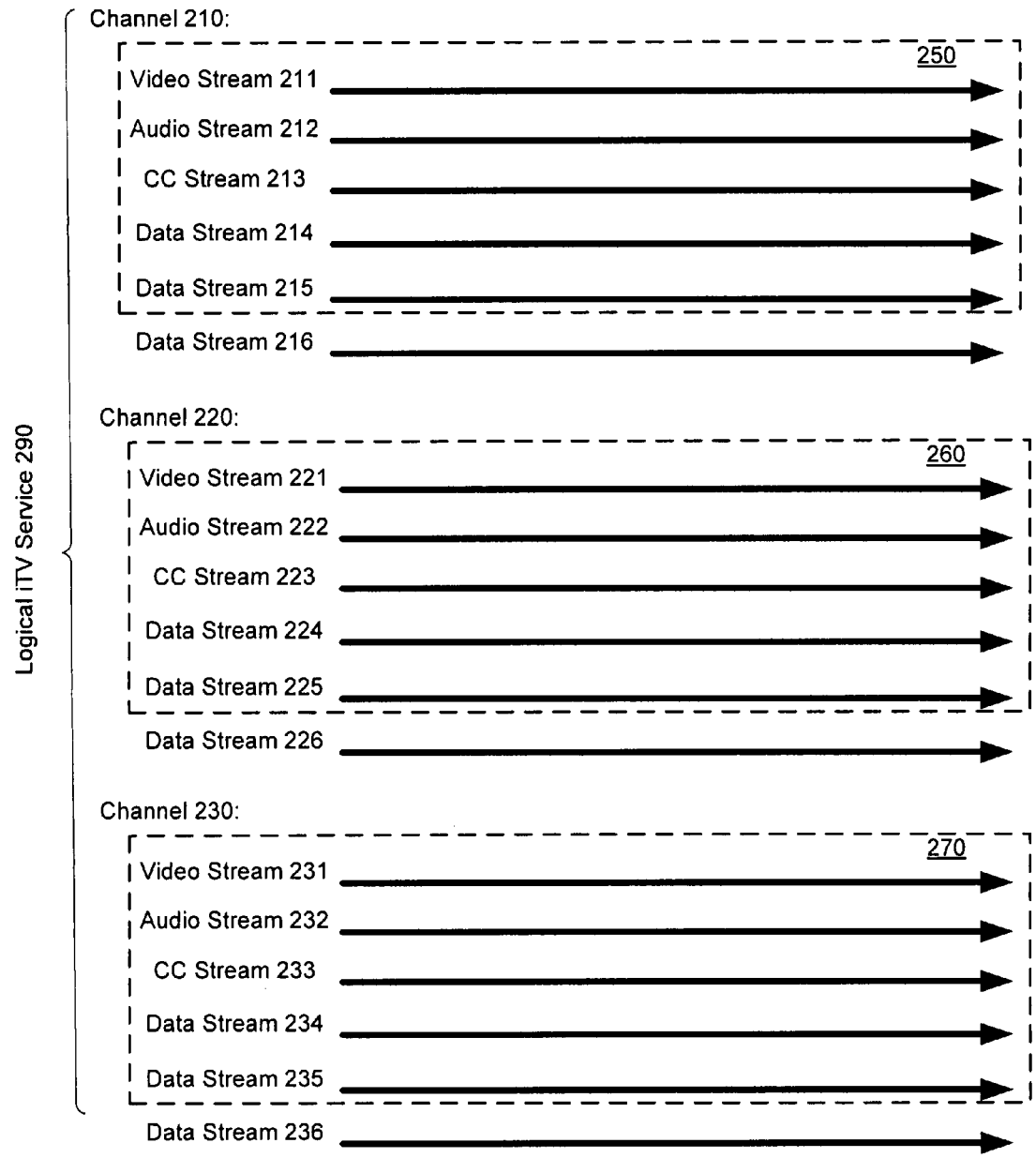
FIG. 2 is a representation of interactive television services, in accordance with one embodiment.

With reference now to FIG. 2, representations of iTV services are depicted, in accordance with one embodiment. It is understood that embodiments are well suited for application across a wide range of services and delivery formats.

In one embodiment, a digital television "channel" can be understood as being made up of a number of data streams, e.g., a video stream, an audio stream, a subtitle or close captioning stream, and potentially several additional data streams. A "physical" iTV service, in this context, is associated with the channel is being transmitted over, and may spread across some or all of the data streams that makeup that channel.

For example, channel 210 in FIG. 2 is shown as including video stream 211, audio stream 212, close captioning stream 213, and three data streams 214, 215, and 216. A physical iTV service 250 is being broadcast via channel 210, and involves video stream 211, audio stream 212, and data streams 214 and 215. In this particular example, the remaining two streams that makeup channel 210 are not required for transmission of physical iTV service 250.

In one embodiment, a "logical" iTV service is made up of one or more physical iTV services; e.g., portions of a logical iTV service will be broadcast using several different physical iTV services, across several different channels. In one such embodiment, what constitutes a logical iTV service is determined from the perspective of the viewer, e.g., some or all of the various options allowed to the viewer would be incorporated into a single logical iTV service. In another embodiment, the boundaries of a logical iTV service may be determined by the broadcaster, e.g., the broadcaster may include some interactive commercial service, in addition to the delivered content.

For example, channels 210, 220, and 230 are broadcasting physical iTV services 250, 260, and 270. All of these physical iTV services are incorporated into a single logical iTV service 290. A viewer interacting with the service provided by logical iTV service 290 may be able to select various portions of the service carried on the different physical iTV services, or may be shifted between them, as appropriate.

In the description that follows, the term "logical iTV feature" will be utilized to describe the superset of all physical iTV services available to a viewer of the feature. For example, if a viewer was watching the Olympic Games as a logical iTV feature, the logical iTV feature might be made up of all available coverage of games occurring at that particular moment, e.g., each on a different physical iTV service, commentary about those games, e.g., on a selectable audio stream, statistics about those games and the related athletes, e.g., on selectable data streams, and a highlights broadcast and gateway service, with brief summaries of the games as they occur and an interactive menu to allow the user to select different games to watch.

In the description that follows, the term "logical iTV sub-feature" will be utilized to describe a portion of a logical iTV feature. For example, if the logical iTV feature being presented is the Olympic Games, a logical iTV sub-feature could be one particular event.

Personal Video Recorder (PVR)

Figure 3:
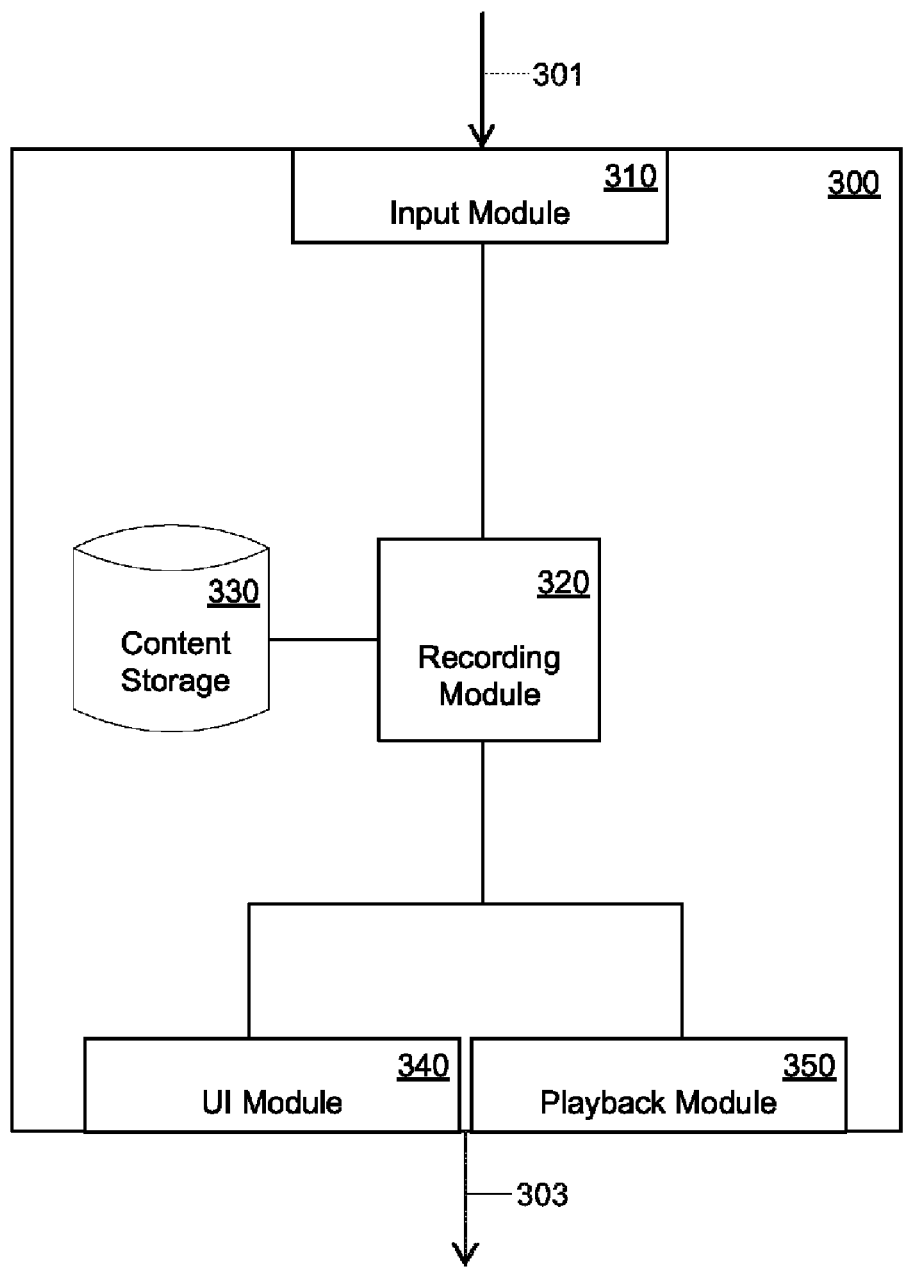
FIG. 3 is a block diagram of a personal video recorder, in accordance with one embodiment.

With reference now to FIG. 3, a block diagram of a personal video recorder (PVR) 300 is presented, in accordance with one embodiment. While PVR 300 is shown as incorporating specific, enumerated features, it is understood that embodiments are well suited to application with additional, fewer, or different elements. In particular, is understood that, in one embodiment, PVR 300 may provide additional functionality, e.g., digital television signal reception.

PVR 300 is shown as including input module 310, recording module 320, storage module 330, user interface (UI) module 340, and playback module 350. PVR 300 is also depicted, in this embodiment, as coupled to connection 301, which provides a connection to a content source, such as a television service provider or a scheduling server. PVR 300 is also depicted, in this embodiment, as coupled to connection 303, which allows for output, e.g., to a television.

In the depicted embodiment, input module 310 allows data to enter PVR 300 from an outside source. In one embodiment, input module 310 encompasses both receiving television channels and communicating with a scheduling server, e.g., through connection 301. In some embodiments, input module 310 may also allow a user to interact with PVR 300, e.g., through the use of an infrared or radio frequency remote control device. In other embodiments, a separate receiver module, not shown, may be used to interact with the user.

As shown, PVR 300 includes recording module 320. In some embodiments, recording module 320 receives a signal from a television provider, e.g., through input module 310, and records those portions of the signal which it has been programmed to record, e.g., those signals corresponding to a particular channel for a specified timeslot. Further, in some embodiments, recording module 320 may perform analysis of some portion of the television signal, or of data or metadata associated with signal. Such embodiments are described in greater detail below.

PVR 300 is also shown as including content storage device 330. Content storage device 330 will vary in nature across different embodiments. In one embodiment, for example, content storage device 330 may consist of one or more hard disk drives. In another embodiment, content storage device 330 is remotely located, rather than integrated into PVR 300, and is accessed through a connection corresponding to a data transfer protocol, e.g., an 802.11g wireless connection to a centralized data storage device.

As depicted, PVR 300 includes user interface module 340. In some embodiments, user interface module 340 allows interaction with a user of PVR 300, e.g., through a remote control. User interface module 340 generates a user interface for PVR 300. In some embodiments, the user would use this user interface to select content to display, as well as configuring options related both to content and to the operation of PVR 300. For example, in one embodiment, user interface module 340 allows the user to select which logical iTV sub-features he or she wishes to record; this embodiment is described in greater detail below.

The depicted embodiment of digital media player 100 also includes playback module 350. In some embodiments, playback module 350 decodes the content the user has selected, in order to enable playback. Further, in some embodiments, playback module 350 provides error handling for playing back recorded iTV services; such an embodiment is described in greater detail below. In several embodiments, user interface module 340 and playback module 350 may be combined into a single module.

Method of Recording Multi-Stream Interactive Television

Figure 4:
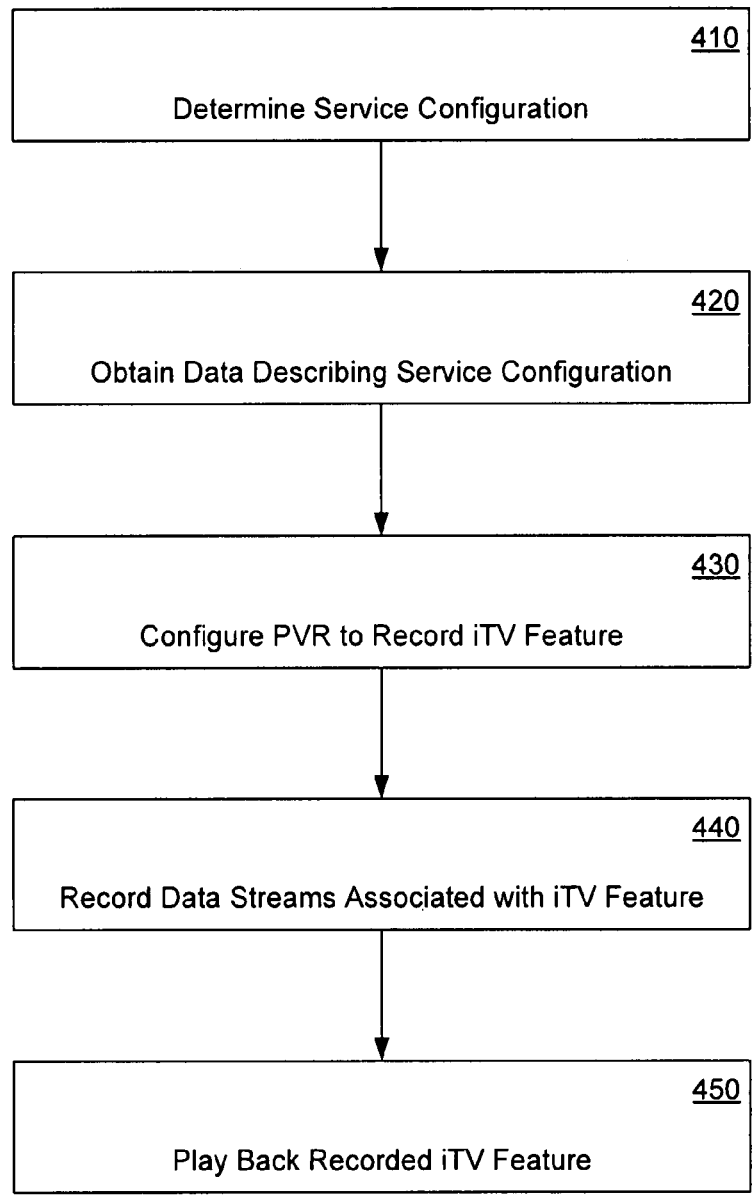
FIG. 4 is a flowchart of a method of recording multi-stream interactive television, in accordance with one embodiment.

With reference now to FIG. 4, a flowchart 400 of a method of recording multi-stream interactive television is presented, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, a service configuration of an iTV feature is determined. In some embodiments, the service configuration of an iTV feature, particularly a logical iTV feature, includes a description of some or all of the interrelationships between different data streams, channels, and/or physical iTV services. In this way, a description of the logical iTV service or feature can be determined. In different embodiments, the step is implemented in different ways. For example, metadata detailing such a service configuration could be included as part of a data stream for an iTV feature. Several other exemplary embodiments are described in greater detail, below, with reference to FIGS. 5A through 5D.

With reference now to step 420, a personal video recorder (PVR) obtains data describing the service configuration of the iTV feature. In some embodiments, this data can be retrieved from an external source, e.g., a remote scheduling server, included with traditional scheduling and programming information. In other embodiments, the PVR may perform some analysis to generate such data. In other embodiments, other approaches are utilized.

For example, with reference to FIG. 3, PVR 300 receives scheduling information via connection 301, to a scheduling server provided by a cable television provider. Included in this scheduling information is data corresponding to the service configuration of a logical iTV feature, a college basketball tournament. The service configuration for this feature indicates that a gateway channel will be utilized, providing highlights and video clips, and also providing an interactive program to allow users to select between several different games, which will be occurring simultaneously. These different games will be broadcast on several different channels, and may only be accessed if they are reached through the interactive program on the gateway channel, which is a premium service.

With reference now to step 430, the PVR is configured to record a portion of the iTV feature. In some embodiments, a user utilizes a user interface to program the PVR. In several such embodiments, the user is provided with a listing of various iTV sub-features available as part of the iTV feature, and is allowed to select which iTV sub-features should be recorded, and/or which should be excluded from recording. In other embodiments, the user simply selects whether or not to record the iTV feature, in a manner analogous to selecting whether or not to record a traditional television broadcast utilizing a traditional PVR. In some embodiments, the user may be permitted to make alterations to the configuration of the PVR at some later time, e.g., the user may configure the PVR to record the entirety of an iTV feature, and then may later return and exclude various sub-features.

Continuing the example, with reference to FIG. 3, the user uses the user interface of his PVR to indicate that he wishes to record the basketball tournament. In particular, the user is only interested in two specific games, and does not wish to record the entire tournament (which would use up a very large portion of the storage capacity of his PVR). The user uses the user interface to select those sub-features he is interested in, namely the two specific basketball games.

With reference now to step 440, the PVR records data streams corresponding to the selected portion of the iTV feature. In some embodiments, the step entails the PVR using the service configuration of the iTV feature, referencing it with the programming instructions of the user, and recording the data streams corresponding to those portions of the iTV feature in which the user has interest.

In some embodiments, the step also includes necessary error handling or prevention techniques. For example, some iTV features include environment signaling. Environment signaling is used in a variety of ways. For example, when a user navigates between two sub-features of an iTV feature, a small piece of data may be provided to the user's digital receiver, e.g., by the first sub-feature. This piece of data may then be accessed by the second sub-feature. If the users only recording the second sub-feature, it may need to emulate this environment signaling during the recording process, in order for the second sub-feature to operate properly.

Continuing the example, with reference to FIG. 3, the PVR records the data streams corresponding to the two specific basketball games the user wanted to watch. These data streams include a video presentation, as well as audio in several different languages, close captioning information, and an interactive program, which allows the user to see statistics for these teams over the course of their season, as well as statistics for the game as it is played. Because the configuration information for the tournament indicates that access to these games needs to come from the gateway program, the PVR also records the necessary environment signal, to allow playback of the recorded games.

With reference now to step 450, the PVR plays back the recorded portion of the iTV feature. In some embodiments, the interactive elements within this portion of the iTV feature are preserved, in a manner that allows the user to interact with them as if he were watching the original broadcast. In other embodiments, some interactive elements may be unavailable, as in the case where the interactive elements correspond to a portion of the iTV feature which was not recorded or if the interactive elements correspond to an interactive function not described by the service configuration of the iTV feature. In several such embodiments, playback of the recorded portion of the iTV feature also includes error handling and checking, such that if the user attempts to interact with an element which is unavailable, for whatever reason, playback of the recorded portion is not compromised.

Continuing the example, with reference to FIG. 3, the PVR plays back one of the two recorded games. The user is allowed to access the statistics program included as part of this broadcast. However, if the user attempts to interact with an unrecorded element, such as selecting an option intended to allow the user to return to the gateway channel, the PVR prevents the user from accessing the unrecorded element, may display some helpful message, and prevents the playback of the iTV sub-feature from crashing or failing.

Determining Service Configuration

In several embodiments, it is necessary to determine the service configuration for a particular iTV feature. For example, iTV features have the potential to be fairly simple, e.g., a single channel broadcast with no interaction with or access to other physical iTV services, or extremely complex, e.g., an iTV feature spanning many physical iTV services, with interaction between those physical iTV services. In order for a PVR to be able to record and playback some or all of an iTV feature, it is necessary to establish what data streams are involved in the feature, and how they are interrelated. Set forth below, with reference to FIGS. 5A through 5D, are a number of different approaches to fulfill this condition.

Figure 5A:
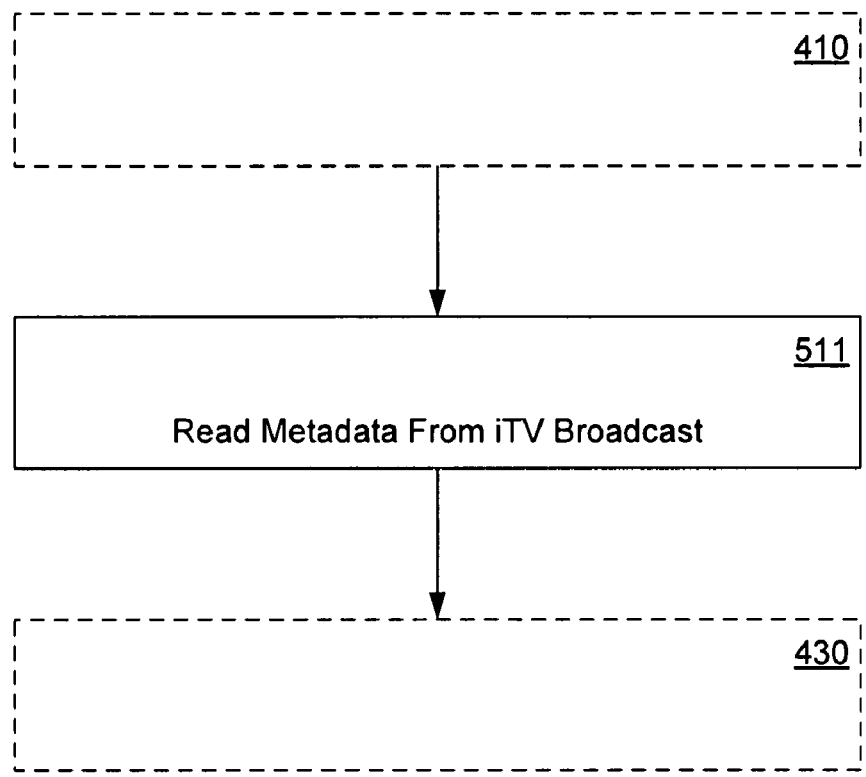
FIG. 5A is a flowchart of the method of determining a service configuration for an iTV feature, in accordance with one embodiment.

With reference now to FIG. 5A, a flowchart 510 of a method of determining a service configuration for an iTV feature is depicted, in accordance with one embodiment. Although specific steps are disclosed in flowchart 510, such steps are exemplary. That is, embodiments of the present invention are well suited to performing various other (additional) steps or variations of the steps recited in flowchart 510. It is appreciated that the steps in flowchart 510 may be performed in an order different than presented, and that not all of the steps in flowchart 510 may be performed.

In the depicted embodiment, the method of flowchart 510 can be performed in place of step 410 of flowchart 400. In step 511, metadata describing the service configuration for an iTV feature is read from the iTV broadcast. In such an embodiment, a standardized format for this metadata could be used, to allow a television service provider to include the metadata as part of the broadcast. One such embodiment could necessitate the need for collaboration with television service providers, e.g., cable companies, and/or standards forming bodies, but would provide a uniform approach to distribution and understanding of such metadata.

Figure 5B:
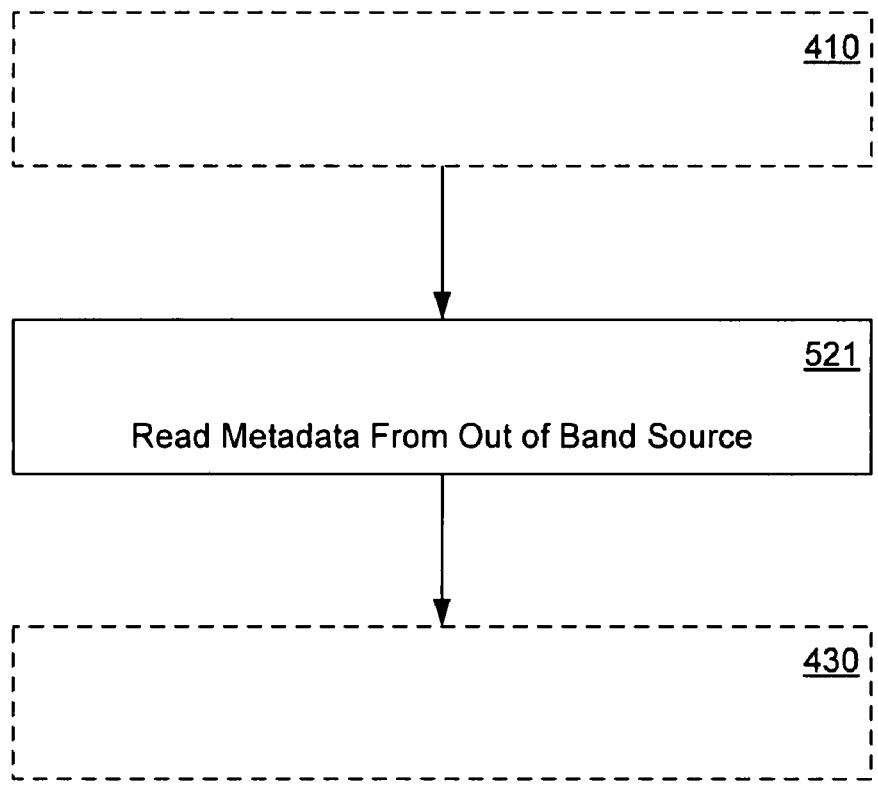
FIG. 5B is a flowchart of the method of determining a service configuration for an iTV feature, in accordance with one embodiment.

With reference now to FIG. 5B, a flowchart 520 of a method of determining a service configuration for an iTV feature is depicted, in accordance with one embodiment. Although specific steps are disclosed in flowchart 520, such steps are exemplary. That is, embodiments of the present invention are well suited to performing various other (additional) steps or variations of the steps recited in flowchart 520. It is appreciated that the steps in flowchart 520 may be performed in an order different than presented, and that not all of the steps in flowchart 520 may be performed.

In the depicted embodiment, the method of flowchart 520 can be performed in place of step 410 a flowchart 400. In step 521, metadata describing the service configuration for an iTV feature is obtained from an out of band source. In several such embodiments, a remote repository, e.g., a scheduling server for a PVR service, can be used to distribute the metadata. In one such embodiment, a uniform metadata format could be established, which offers an advantage in terms of interoperability and uniformity of implementation. By providing this metadata via an out of band source, it could be distributed alongside traditional scheduling and programming information, which would facilitate programming a PVR to record some or all of the iTV feature.

Figure 5C:
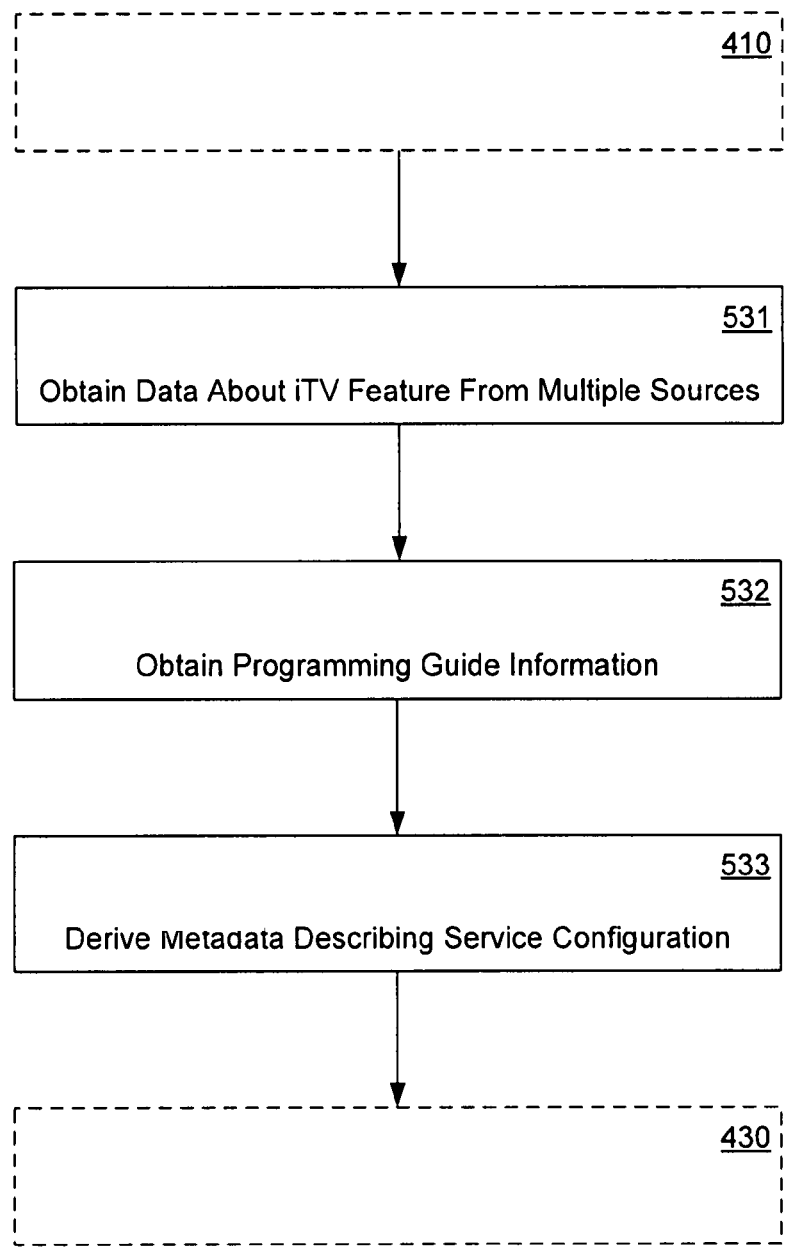
FIG. 5C is a flowchart of the method of determining a service configuration for an iTV feature, in accordance with one embodiment.

With reference now to FIG. 5C, a flowchart 530 of a method of determining a service configuration for an iTV feature is depicted, in accordance with one embodiment. Although specific steps are disclosed in flowchart 530, such steps are exemplary. That is, embodiments of the present invention are well suited to performing various other (additional) steps or variations of the steps recited in flowchart 530. It is appreciated that the steps in flowchart 530 may be performed in an order different than presented, and that not all of the steps in flowchart 530 may be performed.

In the depicted embodiment, the method of flowchart 530 can be performed in place of step 410 a flowchart 400. The method described in flowchart 530 allows for disparate sources or formats of data regarding iTV broadcasts. In step 531, data regarding an iTV feature is obtained from several sources. In some embodiments, this data may also be in several different formats. In step 532, some embodiments obtain programming guide information associated with the iTV feature, e.g., from a scheduling server for a PVR service. In step 533, metadata describing the service configuration of the iTV feature is derived from the multi-source data and the programming guide information.

In some embodiments, this analysis and derivation is performed at a centralized hosting source, e.g., a scheduling server. In several such embodiments, once this analysis is complete, a PVR may connect to the hosting source in order to retrieve this information, e.g., in a manner analogous to that of the method of flowchart 520. In other embodiments, this analysis may be performed by the PVR itself.

In some embodiments, implementation of this method could necessitate the need for some collaboration with broadcasters, e.g., to provide data about iTV features, but would not require a universal format, as the data would be transformed into a format usable by a PVR. In some embodiments, applying such a transformation to service configuration information from a number of sources and in a variety of nonstandard formats, and producing a sense of iTV service configuration information in a single format, facilitates the recording of a high-quality iTV experience. For example, information could be obtained from a broadcaster about the stream configuration of their iTV services. Combining this information with programming guide information allows derivation of the set of iTV features or sub-features which may be recorded.

Figure 5D:
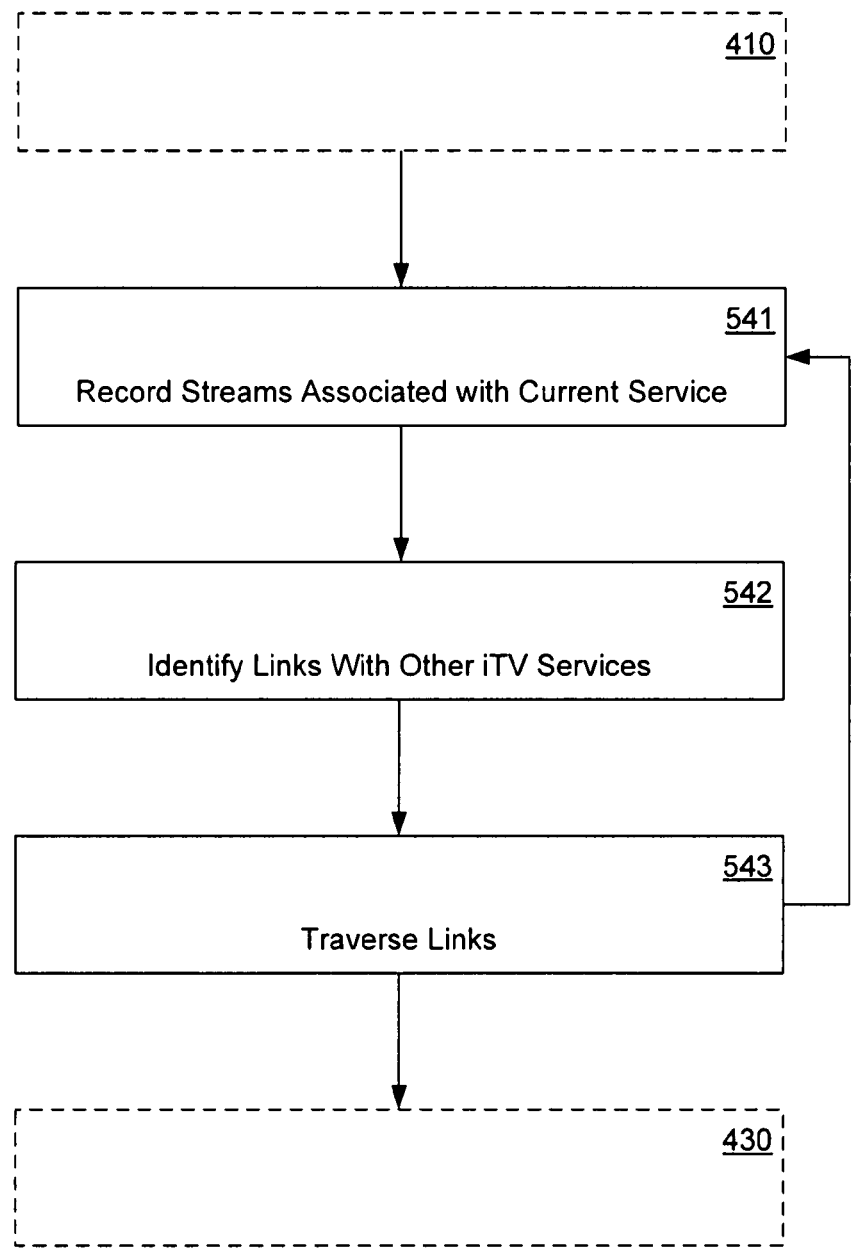
FIG. 5D is a flowchart of the method of determining a service configuration for an iTV feature, in accordance with one embodiment.

With reference now to FIG. 5D, a flowchart 540 of a method of determining a service configuration for an iTV feature is depicted, in accordance with one embodiment. Although specific steps are disclosed in flowchart 540, such steps are exemplary. That is, embodiments of the present invention are well suited to performing various other (additional) steps or variations of the steps recited in flowchart 540. It is appreciated that the steps in flowchart 540 may be performed in an order different than presented, and that not all of the steps in flowchart 540 may be performed.

In the depicted embodiment, the method of flowchart 540 can be performed in place of step 410 a flowchart 400. The method described here allows for a real-time determination of the service configuration for an iTV feature. The iTV feature itself is traversed, in order to detect the interrelationships between various streams and/or physical iTV services. In some embodiments, this involves interpreting the iTV service data to an extent that allows traversal of inter-stream and/or inter-service links, in order to discover the extent of the set of streams referenced by the feature. In one embodiment, the underlying approach involves searching for all links to streams and channels within the current physical iTV service, and where these links point outside of the current service, recursively following the links to discover which additional streams and services are required.

In step 541, the streams that make up the current physical iTV service are added to a record list. In some embodiments, the current physical iTV services are made up of audio, video, data, and subtitle or closed captioning streams.

In step 542, links within the current physical iTV service to another physical iTV service are identified. In some embodiments, links or connections to other channels are identified. Such links could appear as part of an interactive program available to the user, or as automatic channel changes initiated by the iTV feature, or in other ways.

In step 543, the linked services are similarly traversed. In some embodiments, the link services are then subject to the same method described by flowchart 540: the streams that make up the linked services are added to the record list, and links within that service to other physical iTV services are also identified. Those other services, in turn, will also be examined. This recursive examination allows identification of all the interrelated services.

In some embodiments, this analysis and traversal is performed at a centralized hosting source, e.g., a scheduling server. In several such embodiments, once this analysis is complete, a PVR may connect to the hosting source in order to retrieve this information, e.g., in a manner analogous to that of the method of flowchart 520. In other embodiments, this analysis may be performed by the PVR itself.

User Interface

The user interface (UI) for a PVR, in some embodiments, allows for recording some of all of an iTV feature. For complicated iTV features, which may be made up of many different physical iTV services, recording the entirety of the feature could require an excessive amount of available storage. In the case where a user does not wish to watch or interact with every possible sub-feature, a user interface which allows some freedom of choice is useful.

Figure 6A:
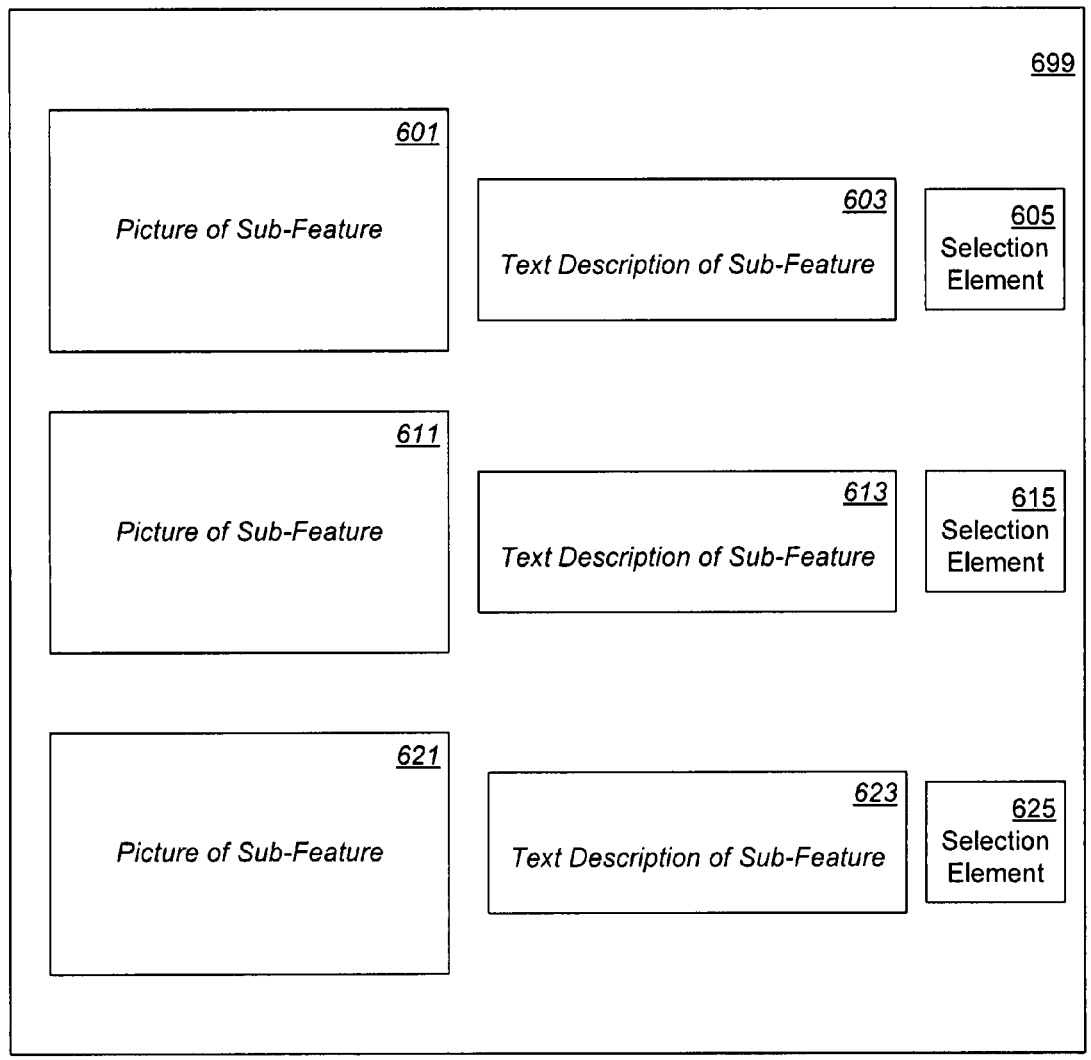
FIG. 6A is a block diagram of a user interface, in accordance with one embodiment.

With reference to FIG. 6A, a block diagram of a user interface 699 is presented, in accordance with one embodiment. While user interface 699 is depicted as incorporating specific, enumerated features, it is understood that embodiments are well suited to applications involving additional, fewer, or different elements.

User interface 699 is shown as displaying several sub-features of an iTV feature. As shown, each sub-feature is described using a picture or video clip, e.g., pictures 601, 611, and 621, as well as a text description, e.g., description 603, 613, and 623. The user then has interactive selection elements, e.g., selection elements 605, 615, and 625, with which to indicate whether a particular sub-feature should be recorded or not.

Figure 6B:
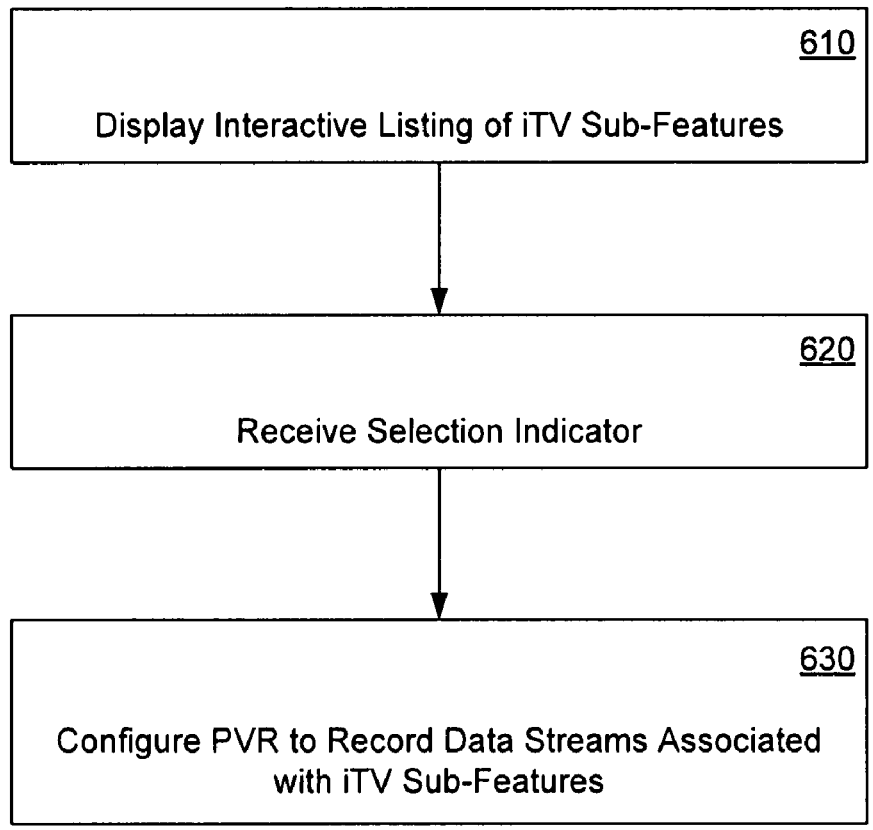
FIG. 6B is a flowchart of a method of configuring recording of iTV sub-features, in accordance with one embodiment.

With reference to FIG. 6B, a flowchart 600 of a method of configuring recording of iTV sub-features is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

In step 610, an interactive listing of available iTV sub-features is displayed. In some embodiments, this listing can be generated from metadata associated with an iTV feature, where the metadata describes the interrelationships between the physical iTV services that make up the iTV feature.

In step 620, a selection indicator is received, to indicate that a particular iTV sub-feature should be recorded. In some embodiments, a user would use a remote control or similar device to interact with the interactive listing, and to select which iTV sub-features they would like to record.

In step 630, a PVR is configured to record data streams which are associated with the indicated sub-feature.

Playback and Error Handling

In some embodiments, it is desirable that a PVR perform some error handling functions, while rendering or playing back the recorded iTV services. The error handling performed by the PVR will vary across different embodiments. In some embodiments, for example, the PVR may need to handle environment signaling, as appropriate, particularly when only portions of a larger iTV feature has been recorded. In other embodiments, the PVR must handle broken links, where the iTV feature offers access to another iTV service which was not recorded.

Figure 7:
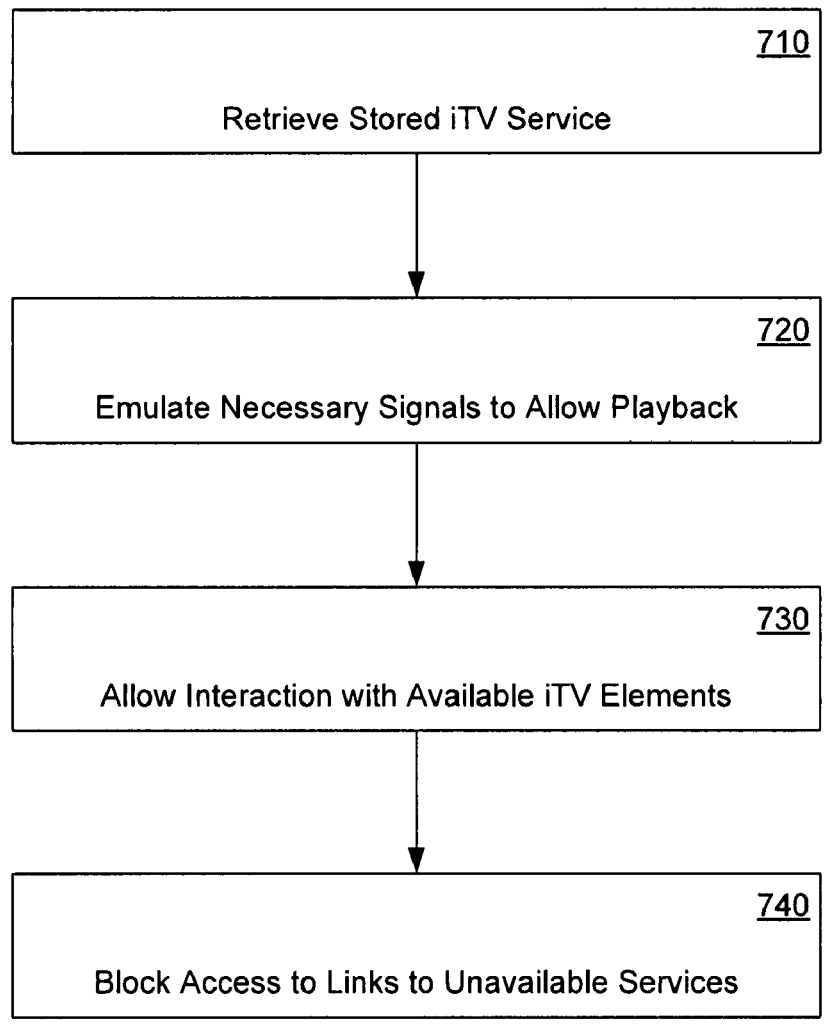
FIG. 7 is a flowchart of a method of playing back a recorded iTV service, in accordance with one embodiment.

With reference to FIG. 7, a flowchart 700 of a method of playing back a recorded iTV service is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

In step 710, the recorded iTV service is retrieved. In some embodiments, iTV services may be stored locally, e.g., in a data storage device included in a PVR. In other embodiments, recorded iTV services may be stored elsewhere.

In step 720, a signal necessary to allow playback is emulated. In some embodiments, it may be necessary to emulate environmental signaling, e.g., if the recorded service depends in some way on another, unrecorded service. In some such embodiments, rather than requiring that the needed service be recorded, the PVR is configured to emulate the necessary environmental signaling.

In step 730, interaction with available interactive elements of the iTV service is allowed. If a portion of an iTV service is self-contained, or links to another recorded portion of the iTV service, in some embodiments the PVR allows the interactive elements of that portion to be utilized.

In step 740, interaction with interactive elements of the iTV service which are linked to unavailable services is prevented. In some embodiments, if an interactive element of a recorded iTV service links to, or relies upon, another iTV service which is not available, the interactive element should either be blocked from user interaction, or user interaction of that element should be intercepted by the PVR, so as to avoid instability in playback.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of recording multi-stream interactive television content, comprising:
    determining a service configuration of an interactive television feature, said interactive television feature providing a gateway program on a gateway channel for accessing a plurality of different interactive television events which are to be broadcast across a plurality of channels, said service configuration describing interrelationships between said interactive television events and indicating that said interactive television events are accessible only through said gateway program on said gateway channel, said gateway program providing necessary signaling which is required by said interactive television events to operate when a user navigates to said interactive television events from said gateway channel of said interactive television feature;
    obtaining data describing said service configuration comprising information describing data streams of each different channel that broadcasts an interactive television event accessible through said gateway channel of said interactive television feature;
    displaying a user interface for a recording device, said user interface comprising an interactive listing of selectable unrecorded interactive television events accessible through said gateway channel of said interactive television feature which are available for recording;
    receiving a user selection from said interactive listing indicating that multiple simultaneously occurring interactive television events are to be recorded and that one or more simultaneously occurring interactive television events are excluded from recording;
    configuring said recording device to record said multiple simultaneously occurring interactive television events based on said user selection and said service configuration by:
        identifying data streams of said multiple simultaneously occurring interactive television events which are to be recorded,
        identifying links among said data streams of said multiple simultaneously occurring interactive television events which are to be recorded, and
        identifying links between said data streams of said multiple simultaneously occurring interactive television events which are to be recorded and data streams of said one or more simultaneously occurring interactive television events which were excluded from recording;

recording said multiple simultaneously occurring interactive television events by:
  storing, in a content storage device, said data streams of said multiple simultaneously occurring interactive television events when broadcast on different channels of said plurality of channels, and
  emulating, by said recording device, necessary signaling provided by said gateway program during said recording of said multiple simultaneously occurring interactive television events for enabling each of said multiple simultaneously occurring interactive television events to operate without being accessed from said gateway program on said gateway channel; and
displaying a recorded interactive television event selected by the user from said multiple simultaneously occurring interactive television events which were recorded by:
  retrieving, from said content storage device, data streams of said recorded interactive television event,
  allowing, during playback of said recorded interactive television event, interaction of interactive elements of said recorded interactive television event with interactive elements of other recorded interactive television events which occurred simultaneously with said recorded interactive television event based on said links identified among said data streams of said multiple simultaneously occurring interactive television events which were recorded, and
  preventing, during said playback of said recorded interactive television event, interaction of interactive elements of said recorded interactive television event with interactive elements of unrecorded interactive television events which occurred simultaneously with said recorded interactive television event based on said links identified between said data streams of said multiple simultaneously occurring interactive television events which were recorded and said data streams of said one or more simultaneously occurring interactive television events which were excluded from recording.

2. The method of claim 1, further comprising:
receiving metadata describing said service configuration as part of a broadcast of said interactive television feature.

3. The method of claim 1, further comprising:
receiving metadata describing said service configuration from an out of band source.

4. The method of claim 3, wherein said out of band source comprises a scheduling server associated with said recording device.

5. The method of claim 1, further comprising:
obtaining programming guide information associated with said interactive television feature; and
deriving metadata describing said service configuration from said programming guide information.

6. The method of claim 1, further comprising:
recursively traversing said interactive television feature to detect links within a particular interactive television event accessible through said gateway channel of said interactive television feature which point outside of said particular interactive television event.

7. The method of claim 1, wherein said multiple simultaneously occurring interactive television events are simultaneously occurring sporting events broadcast on different channels of said plurality of channels.

8. The method of claim 1, further comprising:
displaying, during said playback of said recorded interactive television event, a message in response to user selection of an interactive element of said recorded interactive television event which links to an interactive element of an unrecorded interactive television event which occurred simultaneously with said recorded interactive television event.

9. The method of claim 1, wherein said user interface displays a selection element for each unrecorded interactive television event accessible through said gateway channel for selection by the user from a remote control.

10. A personal video recorder (PVR) comprising:
a processor for executing computer-executable instructions; and
memory storing computer-executable instructions for performing a method of recording multi-stream interactive television content, said method comprising:
  determining a service configuration of an interactive television feature, said interactive television feature providing a gateway program on a gateway channel for accessing a plurality of different interactive television events which are to be broadcast across a plurality of channels, said service configuration describing interrelationships between said interactive television events and indicating that said interactive television events are accessible only through said gateway program on said gateway channel, said gateway program providing necessary signaling which is required by said interactive television events to operate when a user navigates to said interactive television events from said gateway channel of said interactive television feature;
  obtaining data describing said service configuration comprising information describing data streams of each different channel that broadcasts an interactive television event accessible through said gateway channel of said interactive television feature;
  displaying a PVR user interface comprising an interactive listing of selectable unrecorded interactive television events accessible through said gateway channel of said interactive television feature which are available for recording;
  receiving a user selection from said interactive listing indicating that multiple simultaneously occurring interactive television events are to be recorded and that one or more simultaneously occurring interactive television events are excluded from recording;
  configuring said PVR to record said multiple simultaneously occurring interactive television events based on said user selection and said service configuration by:
    identifying data streams of said multiple simultaneously occurring interactive television events which are to be recorded,
    identifying links among said data streams of said multiple simultaneously occurring interactive television events which are to be recorded, and
    identifying links between said data streams of said multiple simultaneously occurring interactive television events which are to be recorded and data streams of said one or more simultaneously occurring interactive television events which were excluded from recording;
  recording said multiple simultaneously occurring interactive television events by:
    storing, in a content storage device, said data streams of said multiple simultaneously occurring interactive television events when broadcast on different channels of said plurality of channels, and emulating, by said recording device, necessary signaling provided by said gateway program during said recording of said multiple simultaneously occurring interactive television events for enabling each of said multiple simultaneously occurring interactive television events to operate without being accessed from said gateway program on said gateway channel; and displaying a recorded interactive television event selected by the user from said multiple simultaneously occurring interactive television events which were recorded by:

retrieving, from said content storage device, data streams of said recorded interactive television event, allowing, during playback of said recorded interactive television event, interaction of interactive elements of said recorded interactive television event with interactive elements of other recorded interactive television events which occurred simultaneously with said recorded interactive television event based on said links identified among said data streams of said multiple simultaneously occurring interactive television events which were recorded, and preventing, during said playback of said recorded interactive television event, interaction of interactive elements of said recorded interactive television event with interactive elements of unrecorded interactive television events which occurred simultaneously with said recorded interactive television event based on said links identified between said data streams of said multiple simultaneously occurring interactive television events which were recorded and said data streams of said one or more simultaneously occurring interactive television events which were excluded from recording.

11. The PVR of claim 10, wherein:
said multiple simultaneously occurring interactive television events are simultaneously occurring sporting events broadcast on different channels of said plurality of channels.

12. The PVR of claim 10, wherein said PVR user interface displays a selection element for each unrecorded interactive television event accessible through said gateway channel for selection by the user from a remote control.

13. The PVR of claim 10, wherein said PVR user interface displays a picture and a description for each of said unrecorded interactive television events accessible through said gateway channel that are available for recording.

14. A computer-readable storage medium that does not consist of a signal, said computer-readable storage medium storing computer-executable instructions that, when executed, cause a computing device to perform steps comprising:

determining a service configuration of an interactive television feature, said interactive television feature providing a gateway program on a gateway channel for accessing a plurality of different interactive television events which are to be broadcast across a plurality of channels, said service configuration describing interrelationships between said interactive television events and indicating that said interactive television events are accessible only through said gateway program on said gateway channel, said gateway program providing necessary signaling which is required by said interactive television events to operate when a user navigates to said interactive television events from said gateway channel of said interactive television feature;

obtaining data describing said service configuration comprising information describing data streams of each different channel that broadcasts an interactive television event accessible through said gateway channel of said interactive television feature;

displaying a user interface for a recording device, said user interface comprising an interactive listing of selectable unrecorded interactive television events accessible through said gateway channel of said interactive television feature which are available for recording;

receiving a user selection from said interactive listing indicating that multiple simultaneously occurring interactive television events are to be recorded and that one or more simultaneously occurring interactive television events are excluded from recording;

configuring said recording device to record said multiple simultaneously occurring interactive television events based on said user selection and said service configuration by:

identifying data streams of said multiple simultaneously occurring interactive television events which are to be recorded, identifying links among said data streams of said multiple simultaneously occurring interactive television events which are to be recorded, and identifying links between said data streams of said multiple simultaneously occurring interactive television events which are to be recorded and data streams of said one or more simultaneously occurring interactive television events which were excluded from recording;

recording said multiple simultaneously occurring interactive television events by:

storing, in a content storage device, said data streams of said multiple simultaneously occurring interactive television events when broadcast on different channels of said plurality of channels, and emulating, by said recording device, necessary signaling provided by said gateway program during said recording of said multiple simultaneously occurring interactive television events for enabling each of said multiple simultaneously occurring interactive television events to operate without being accessed from said gateway program on said gateway channel; and displaying a recorded interactive television event selected by the user from said multiple simultaneously occurring interactive television events which were recorded by:

retrieving, from said content storage device, data streams of said recorded interactive television event, allowing, during playback of said recorded interactive television event, interaction of interactive elements of said recorded interactive television event with interactive elements of other recorded interactive television events which occurred simultaneously with said recorded interactive television event based on said links identified among said data streams of said multiple simultaneously occurring interactive television events which were recorded, and preventing, during said playback of said recorded interactive television event, interaction of interactive elements of said recorded interactive television event with interactive elements of unrecorded interactive television events which occurred simultaneously with said recorded interactive television event based on said links identified between said data streams of said multiple simultaneously occurring interactive television events which were recorded and said data streams of said one or more simultaneously occurring interactive television events which were excluded from recording.

15. The computer-readable storage medium of claim 14, said steps further comprising:

displaying, during said playback of said recorded interactive television event, a message in response to user selection of an interactive element of said recorded interactive television event which links to an interactive element of an unrecorded interactive television event which occurred simultaneously with said recorded interactive television event.

16. The method of claim 1, wherein said user interface displays a picture and a description for each of said unrecorded interactive television events accessible through said gateway channel that are available for recording.

17. The PVR of claim 10, wherein said method further comprises:

recursively traversing said interactive television feature to detect links within a particular interactive television event accessible through said gateway channel of said interactive television feature which point outside of said particular interactive television event.

18. The computer-readable storage medium of claim 14, wherein said user interface displays a picture and a description for each of said unrecorded interactive television events accessible through said gateway channel that are available for recording.

19. The computer-readable storage medium of claim 14, said steps further comprising:

recursively traversing said interactive television feature to detect links within a particular interactive television event accessible through said gateway channel of said interactive television feature which point outside of said particular interactive television.

20. The computer-readable storage medium of claim 14, wherein said multiple simultaneously occurring interactive television events are simultaneously occurring sporting events broadcast on different channels of said plurality of channels.

* * * * *

UNITED STATES PATENT AND TRADEMARK OFFICE
CERTIFICATE OF CORRECTION

PATENT NO.         : 8,136,136 B2                                           Page 1 of 1
APPLICATION NO.    : 11/704521
DATED              : March 13, 2012
INVENTOR(S)        : Steele et al.

It is certified that error appears in the above-identified patent and that said Letters Patent is hereby corrected as shown below:

In column 18, line 15, in Claim 19, delete "television." and insert -- television event. --, therefor.

Signed and Sealed this
Thirtieth Day of October, 2012

David J. Kappos
*Director of the United States Patent and Trademark Office*